United States Patent Office 3,207,256
Patented Sept. 21, 1965

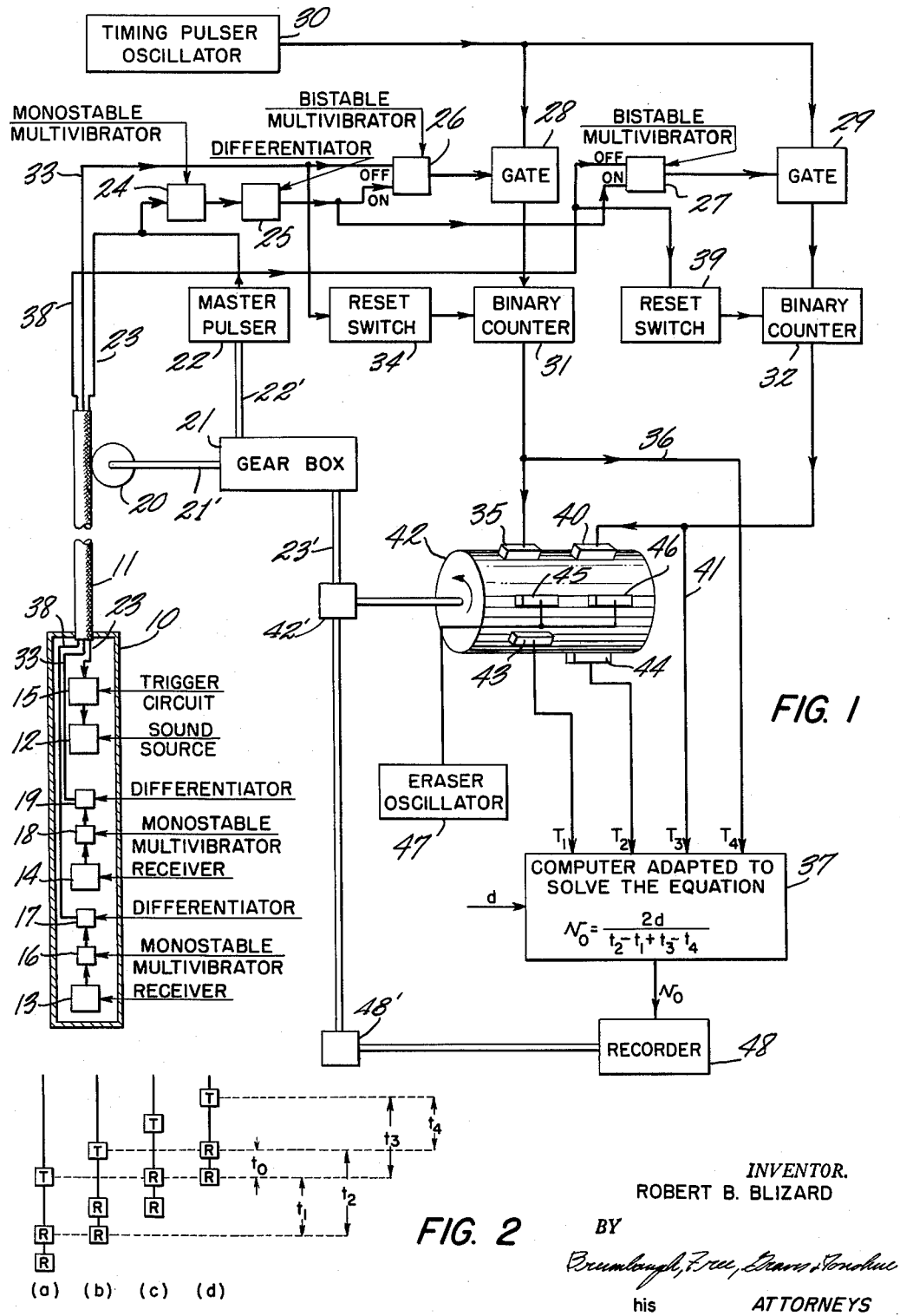

3,207,256
ACOUSTIC WELL LOGGING
Robert B. Blizard, Houston, Tex., assignor to Schlumberger Well Surveying Corporation, Houston, Tex., a corporation of Delaware
Filed Sept. 21, 1959, Ser. No. 841,285
10 Claims. (Cl. 181—.5)

This invention relates to an apparatus for exploring earth formations traversed by a bore. More particularly, it has to do with improved techniques and means for obtaining information about the characteristics of the earth formations by recording the velocity of travel of acoustic waves through the earth formations.

The velocity of acoustic waves through earth formations varies with the type and the condition of the formations and, therefore, a determination of the wave velocity is helpful in determining their characteristics. It has been proposed heretofore to determine the wave velocity by placing a wave generator and a plurality of receivers in longitudinally spaced apart relation in the bore and measuring the length of time required for a wave from the generator to travel from one receiver to another. This method is subject to error, however, by an amount dependent upon the bore diameter and the position of the apparatus relative to the center of the bore. A second source of error may be introduced by the presence of caves in the side wall of the bore because the velocity of the waves in the bore fluid is less than the velocity of the waves in the earth formations.

In an effort to overcome the above noted deficiencies, it has also been proposed to position the receivers between two wave generators located at opposite ends of the array. By averaging the travel times of waves from the two generators in going from one receiver to the other, the accuracy of the measurements may be substantially improved. However, this technique is not entirely satisfactory since the added transmitter increases the length, weight and complexity of the apparatus and doubles the amount of information required to be transmitted to the surface.

It is, therefore, an object of this invention to provide a new and improved well logging method and apparatus for determining the velocity of propagation of acoustic waves in the earth formations surrounding a bore that is independent of the size of the bore and is substantially insensitive to the presence of caves in the side wall of the bore.

Another object of this invention is the provision of a novel well logging method and apparatus of the above character wherein the apparatus disposed in the bore is of decreased length, weight and complexity.

These and other objects are attained in one embodiment of the invention by disposing in a bore apparatus comprising an acoustic wave generator and a plurality of receivers, the receivers being mounted in longitudinally spaced apart relation to each other and to the generator. Indications are obtained as a function of borehole depth of the times required for each of a succession of waves to travel in the earth formations from the generator to the respective receivers. The travel times obtained with the apparatus at any given level in the borehole are combined with the travel time to the most distant receiver previously obtained when the wave generator was at the present level of the receiver nearest the wave generator, and the travel time to the receiver nearest the wave generator previously obtained when the latter was at the present level of the most distant receiver, in such fashion as to give an average value for the wave velocity in the earth formations adjacent the wave receivers at the given level. Thus, the average value obtained provides a more accurate measurement, particularly where a cave is present at the given level.

This invention may be better understood from the following detailed description of a representative embodiment, taken in conjunction with the accompanying figures of the drawing in which:

FIGURE 1 is a schematic diagram, partly in section, of typical well logging apparatus constructed in accordance with the invention; and FIGURE 2 is a diagram showing typical relative positions with respect to depth, but offset laterally from its true positions, of the apparatus for wave travel time values that are combined according to the invention.

The structure illustrated in FIGURE 1 includes a support 10 carried by a cable 11 and adapted to be lowered into a bore by a conventional winch (not shown). A plurality of conductors 23, 33 and 38 are contained within the cable 11 and insulated therefrom and connect a plurality of electrical elements in the support 10 to elements at the surface of the ground. Mounted in longitudinally spaced apart relationship in the support 10 are an acoustic source 12 and two receivers 13 and 14, the distance between the generator 12 and the receiver 14 being twice the distance between the two receivers 13 and 14 in the embodiment of the invention illustrated. It will be noted in this connection that FIG. 1 is not drawn to scale. A trigger circuit 15 is connected to the source 12 and causes it to fire when an electrical impulse is received from the surface of the ground. Monostable vibrators 16 and 18 and differentiator circuits 17 and 19 are connected to the outputs from receivers 13 and 14, respectively.

A measuring wheel 20 at the surface of the ground is maintained in frictional contact with the supporting cable 11 and drives a gear box 21 by means of mechanical linkage 21' at a rate proportional to the rate of travel of the support 10 in the bore. By means of mechanical linkage 22', the gear box 21 operates a master pulsing circuit 22 which delivers an output pulse at equal depth intervals in the bore. The gear box 21 also drives a memory means such as a magnetic recording drum 42 and a recorder 48 by means of mechanical linkages 42' and 48', respectively, for purposes that will be explained hereinafter.

A pulse delivered by the master pulsing circuit 22 is delivered along the conductor 23 to the trigger circuit 15 in the support 10 and fires the sound source 12. The source 12 generates an acoustic or pressure wave that travels through the earth formations and reaches receivers 14 and 13 in that order. The master pulse also triggers a monostable multivibrator 24 to produce an output wave that is converted into a sharp peaked signal by a differentiator circuit 25. Differentiator circuit 25 is connected to turn on two bistable multivibrators 26 and 27 which control the operation of two electronic gates 28 and 29, respectively.

When gates 28 and 29 are open, pulses from a timing pulser oscillator 30 pass through the two gates and are counted by two binary counters 31 and 32. Pulses will continue to register on the counters until signals generated by receivers 14 and 13 close the gates. When an acoustic wave generated by the source 12 reaches the receiver 14, it triggers the monostable multivibrator 18 and causes the differentiator circuit 19 to produce a sharp pulse output which is carried to the surface of the ground by conductor 33. This pulse turns off the bistable multivibrator 26 which closes gate 28 and operates a reset switch 34 for the counter 31. The reset switch 34 permits the binary counter to deliver an accumulated count to a magnetic recording head 35 and to a computer 37 along a channel 36 and also resets the counter 31 to zero.

When an acoustic wave generated by the source 12 reaches the receiver 13, it operates the monostable multivibrator 16 and the differentiator circuit 17 and produces a sharp pulse output similar to that generated by receiver 12. This pulse is carried by conductor 38 to the surface of the ground and turns off the bistable multivibrator 27, which closes gate 29, and operates a reset switch 39 for the counter 32. The reset switch 39 permits the binary counter 32 to deliver an accumulated count to a magnetic recording head 40 and to the computer 37 along channel 41 and also resets the counter 32 to zero.

Since gates 28 and 29 are open from the time a wave is generated until it reaches the receivers, the numbers of pulses counted by counters 31 and 32, respectively, indicate the time required for the wave to travel from the source to the two receivers. These counts are delivered to the magnetic recording heads 35 and 40 and are registered, preferably in binary form, on a magnetic recording drum 42. The rotating drum stores this information until it passes under a pair of magnetic detecting heads 43 and 44, at which time it is picked up and delivered to the computer 37. Further rotation of the drum 42 causes the numbers to be erased by two erasing heads 45 and 46 which are connected to an eraser oscillator 47.

The computer 37 is adapted to operate according to the equation $$V_o = \frac{2d}{t_2 - t_1 + t_3 - t_4}$$

where $d$ is the distance between the receivers 13 and 14, $t_1$, $t_2$, $t_3$ and $t_4$ are the time measurements delivered to the computer preferably in binary form, and $V_o$ is the velocity of the acoustic waves through the earth formations between the two receivers. The output $V_o$ from the computer 37 is registered on a recorder 48, also driven by the measuring wheel 20, which produces a log of $V_o$ versus depth in the bore.

In operation, the length of time for an acoustic wave to travel from the source 12 to each of the receivers 13 and 14 is measured each time a master pulse is sent down the cable. These two measurements are combined in the computer 37 with two measurements previously made at former positions in the bore and recorded on the magnetic recording drum 42, and the computer 37 calculates the velocity of the acoustic waves in the earth formations between the receivers at the present position. The two measurements made at each position in the bore are used directly in the computer 37 and are also stored on the magnetic drum 42 for future use at a later position in the bore. Thus, it will be appreciated that measurements are made several times per foot of cable travel and the data are stored on the drum for successive measurements.

The operation of the invention may be better understood with reference to FIGURE 2. The time $t_1$ for a wave from the transmitter to travel to the nearest receiver is measured at location ($a$) in the bore and registered on the magnetic drum 42. At location ($b$), the time $t_2$ for a wave from the transmitter to travel to the farthest receiver is measured and is also registered on the magnetic drum. At location ($d$), time measurements $t_3$ and $t_4$ are made, and electrical impulses corresponding thereto are channelled directly to computer 37. The detector heads 43 and 44 are positioned angularly with respect to one another and adjacent the magnetic drum 42 so that when the apparatus is at location ($d$) they will pick up the previously recorded measurements $t_1$ and $t_2$ and deliver them to the computer at exactly the same time that the measurements $t_3$ and $t_4$ arrive.

By subtracting $t_1$ from $t_2$ and $t_4$ from $t_3$, the time $t_0$ is determined from spaced positions of the apparatus in the bore. Thus, the time $t_0$ is obtained by addition of the differences between $t_1$, $t_2$ and $t_4$, $t_3$ divided by two. The average time $t_0$ thus increases the accuracy of the measurement over the distance $d$ between the two receivers and, since $d$ is known, $V_o$, the velocity of the waves in the formations between the receivers, may be calculated from the equation $$V_o = \frac{2d}{t_2 - t_1 + t_3 - t_4}$$

Computer 37 is of a conventional type and is adapted to calculate $V_o$ as it receives the above-described time measurements.

It should be understood that $V_o$ is determined at regularly spaced locations separated preferably by any submultiple of both the spacing and the span. For example, at locations ($a$), ($b$), ($c$) and ($d$) in the bore, the various time measurements are combined with the time measurements made at prior locations in the above prescribed manner. Very effective use is made of the measurements, therefore, because each measurement is used twice, first when it is channelled directly into the computer and again when it is stored on the magnetic drum and later channelled to the computer. Thus, short distance intervals are accurately obtained without the need of complex bore equipment.

While a representative embodiment of the present invention has been shown and described for purposes of illustration, it is apparent that changes and modifications may be made without departing from this invention in its broader aspects. Therefore, the invention described herein is not to be construed as limited to the specific embodiment described, but is intended to encompass all modifications thereof coming within the scope of the following claims.

I claim:

1. In apparatus for exploring earth formations traversed by a bore, the combination of an acoustic wave generator, a plurality of acoustic wave detectors, means mounting said generator and said detectors for movement through the bore in longitudinally spaced apart relation to each other, means responsive to the outputs of said generator and wave detectors for providing signals representing the travel times for acoustic wave energy from said generator to said respective detectors at each of a plurality of levels in said bore, means responsive to said signals for producing undelayed signal components corresponding thereto and signal components corresponding thereto that are delayed by a different amount for each generator-detector spacing, and computer means jointly responsive to said delayed and undelayed signal components at each of said levels for providing an average travel time measurement for a given section of the bore.

2. In apparatus for exploring earth formations traversed by a bore, the combination of an acoustic wave generator, a plurality of acoustic wave detectors, means mounting said generator and said detectors for movement through the bore in longitudinally spaced apart relation to each other, means responsive to the outputs of said generator and wave detectors for providing signals representing the travel times for acoustic wave energy from said generator to said respective detectors, memory means responsive to said signal providing means for recording the respective signal outputs thereof as they occur, means responsive to said recorded signal representations for generating signals corresponding thereto at later times, and computer means jointly responsive to the signal outputs from said signal providing means representing travel times at one level and to the signals generated in response to said recorded signal representations by said signal generating means representing travel times at a previous level for providing an average travel time measurement for a given section of the bore.

3. In apparatus for exploring earth formations traversed by a bore, the combination of an acoustic wave generator, a plurality of acoustic wave detectors, means mounting said generator and said detectors for movement through the bore in longitudinally spaced apart relation to each other with the detectors spaced at unequal distances from said generator, means responsive to the outputs of said generator and wave detectors for providing signals representing the travel times for acoustic wave energy from said generator to said respective detectors, memory means responsive to said signal providing means for retaining records of the respective signal outputs thereof, first means responsive to said signal records for generating first signals representing the travel time for acoustic wave energy from said generator to the detector nearest thereto when said nearest detector is at a reference level, second means responsive to said signal records for generating second signals representing the travel time for acoustic wave energy from said generator to the detector farthest therefrom when said farthest detector is at said reference level, and computer means jointly responsive to said first and second signals and to signals from said signal providing means representing the travel times for acoustic wave energy from said generator to said respective detectors with the detector nearest the generator located at the level previously occupied by the generator when the detector farthest away therefrom was at said reference position.

4. In apparatus for exploring earth formations traversed by a bore, the combination of an acoustic wave generator, a plurality of acoustic wave detectors, means mounting said generator and said detectors for movement through the bore in longitudinally spaced apart relation, means responsive to the outputs of said generator and wave detectors for generating first and second signals representing the travel times for acoustic wave energy from said generator to said respective detectors, a record medium movable in accordance with the movement of said generator and said detectors in the bore, means responsive to said first and second signals for recording representations thereof on said record medium, means responsive to said recorded representations for deriving third and fourth signals corresponding thereto, and computer means jointly responsive to said first, second, third and fourth signals for providing an average travel time measurement for a given section of the bore.

5. In apparatus for exploring earth formations traversed by a bore, the combination of an acoustic wave generator, a plurality of acoustic wave detectors adapted to detect waves from said generator and to generate outputs in response thereto, means mounting said generator and said detectors for movement through the bore in longitudinally spaced apart relation, pulse generator means, first and second counter means, first gate means responsive to a signal from said generator for connecting said first counter means to receive pulses from said pulse generator means and responsive to the output of one of said detectors for disconnecting said counter means, second gate means responsive to said generator for connecting said second counter means to receive pulses from said pulse generator means and responsive to the output of another of said plurality of detectors for disconnecting said second counter means, means responsive to said counter means for recording the counts registered thereby, and computer means jointly responsive to said recorded counts and to the outputs of said counter means for providing an average travel time measurement for a given section of the bore.

6. In apparatus for exploring earth formations traversed by a bore, the combination of an acoustic wave generator, a plurality of acoustic wave detectors adapted to detect waves from said generator and to generate outputs in response thereto, means mounting said generator and said detectors for movement through the bore in longitudinally spaced apart relation, pulse generator means, first and second counter means, first gate means responsive to a signal from said generator for connecting said first counter means to receive pulses from said pulse generator means and responsive to the output of one of said detectors for disconnecting said counter means, second gate means responsive to said generator for connecting said second counter means to receive pulses from said pulse generator means and responsive to the output of another detector for disconnecting said second counter means, a record medium movable in accordance with the movement of said generator and said detectors in the bore, means responsive to said counter means for recording on said record medium first and second signals representing the counts registered in said first and second counter means, respectively, means responsive to said record medium for deriving third and fourth signals from the signals recorded on said medium, and computer means jointly responsive to said first, second, third and fourth signals for providing an average travel time measurement for a given section of the bore.

7. Apparatus as defined in claim 6 in which the computer means includes addition, subtraction, multiplication and division means adapted to compute a function of the average of the difference between the first and second signals and the difference between the third and fourth signals.

8. In apparatus for exploring earth formations traversed by a bore, the combination of at least two acoustic wave transducers, means mounting said transducers for movement through the bore in longitudinally spaced apart relation to each other, means disposed in longitudinally spaced relation to said transducers for periodically generating acoustic waves in the earth formations adjacent said transducers as said transducers are moved through various levels in said bore, means responsive to the outputs of said transducers and generating means for obtaining signals representative of the acoustic wave travel time between said generating means and said transducers at each of said various levels, means responsive to said signals obtained at said various levels in the bore for delaying the same to coincide in time with undelayed signals obtained at subsequent levels in the bore, and means responsive to said coincident delayed and undelayed signals obtained for each of said various levels for providing an average travel time measurement for a given section of the bore.

9. In apparatus for exploring earth formations traversed by a bore, the combination of at least two acoustic wave transducers, means mounting said acoustic transducers for movement through the bore in longitudinally spaced apart relation to each other, single means disposed in longitudinally spaced relation to said transducers for periodically generating acoustic waves in the earth formations adjacent said transducers as said transducers are moved through various levels in the bore, means responsive to the outputs of said transducers and generating means for obtaining signals representative of the acoustic wave travel time between said generating means and said transducers at each of said various levels in the bore, memory means responsive to said signals for producing signal components corresponding thereto that have been delayed for a predetermined period of time, and means for combining said delayed signal components from said memory means and undelayed signals obtained at subsequent levels in the bore for providing an average travel time measurement for a given section of the bore.

10. In apparatus for exploring earth formations traversed by a bore, the combination of a plurality of acoustic wave transducers, only one of which is an acoustic wave generator, means mounting said transducers for movement through various levels in the bore in longitudinally spaced apart relation to each other, means including said transducers for periodically obtaining signals representative of the acoustic wave travel times between at least two pairs of differently spaced-apart transducers at each of said various levels in the bore, means for delaying by respectively different amounts the signals representative of the travel times between said pairs of spaced-apart transducers, and means operable as said transducers move through said bore for combining the signals obtained at each of said various levels with the delayed signals obtained at the respective preceding levels to provide average travel time measurements for given sections of the bore.

References Cited by the Examiner

UNITED STATES PATENTS

| | | | |
|---|---|---|---|
| 2,708,485 | 5/55 | Vogel | 181—0.5 |
| 2,836,359 | 5/58 | Mazzagatti | 340—15.5 X |
| 2,926,331 | 2/60 | Lindsey | 181—0.5 X |
| 2,938,592 | 5/60 | Charske et al. | 181—0.5 |
| 2,949,973 | 8/60 | Broding et al. | 181—.5 |
| 2,975,399 | 3/61 | Burns | 181—.5 X |
| 3,014,551 | 12/61 | Feagin et al. | 181—.5 |
| 3,015,085 | 12/61 | Piety | 181—.5 X |
| 3,018,839 | 1/62 | Isaacson | 181—.5 |

SAMUEL FEINBERG, *Primary Examiner.*

CHARLES W. ROBINSON, CHESTER L. JUSTUS,
*Examiners.*